United States Patent [19]

Okamoto et al.

[11] Patent Number: 4,471,249

[45] Date of Patent: Sep. 11, 1984

[54] ROTARY ELECTRIC MACHINE OF THE TYPE HAVING A LIQUID-COOLED ROTOR

[75] Inventors: Kouichi Okamoto; Norio Oishi, both of Kobe, Japan

[73] Assignee: Mitsubishi Denki Kabushiki Kaisha, Tokyo, Japan

[21] Appl. No.: 439,717

[22] Filed: Nov. 4, 1982

[30] Foreign Application Priority Data

Feb. 25, 1982 [JP] Japan .................................. 57-28307
Feb. 25, 1982 [JP] Japan .................................. 57-28308

[51] Int. Cl.³ .............................................. H02K 1/32
[52] U.S. Cl. ....................................... 310/61; 310/165
[58] Field of Search ......................... 310/52, 54, 57, 58, 310/59, 60 R, 60 A, 61, 64, 65, 71, 165, 261, 113

[56] References Cited

U.S. PATENT DOCUMENTS

| | | | |
|---|---|---|---|
| 3,393,333 | 7/1968 | Kudlacik | 310/61 |
| 3,469,125 | 9/1969 | Kranz | 310/54 |
| 3,524,090 | 8/1970 | Sark | 310/58 |
| 3,733,502 | 5/1973 | Curtis | 310/61 |
| 3,895,246 | 7/1975 | Fidei | 310/61 |
| 3,916,230 | 10/1975 | Albaric | 310/61 |
| 4,066,921 | 1/1978 | Blank | 310/54 |
| 4,155,019 | 5/1979 | Weghaupt | 310/61 |

FOREIGN PATENT DOCUMENTS

| | | |
|---|---|---|
| 50-21642 | 7/1975 | Japan . |
| 51-10304 | 1/1976 | Japan . |
| 54-285 | 1/1979 | Japan . |

*Primary Examiner*—R. Skudy
*Attorney, Agent, or Firm*—Wenderoth, Lind & Ponack

[57] ABSTRACT

The invention is concerned with the construction of a connection portion between the generator shaft and the exciter shaft of a rotary electric machine of the type having a liquid-cooled rotor such as a turbine generator. Construction of the connection portion consists of; a junction portion between the generator shaft and the exciter shaft, a junction portion between a coolant path in the generator shaft and a coolant path in the exciter shaft, and a connection portion of electric circuits therein, which are located at places deviated in the axial direction, in order to enhance the reliability thereof.

5 Claims, 2 Drawing Figures

FIG. I
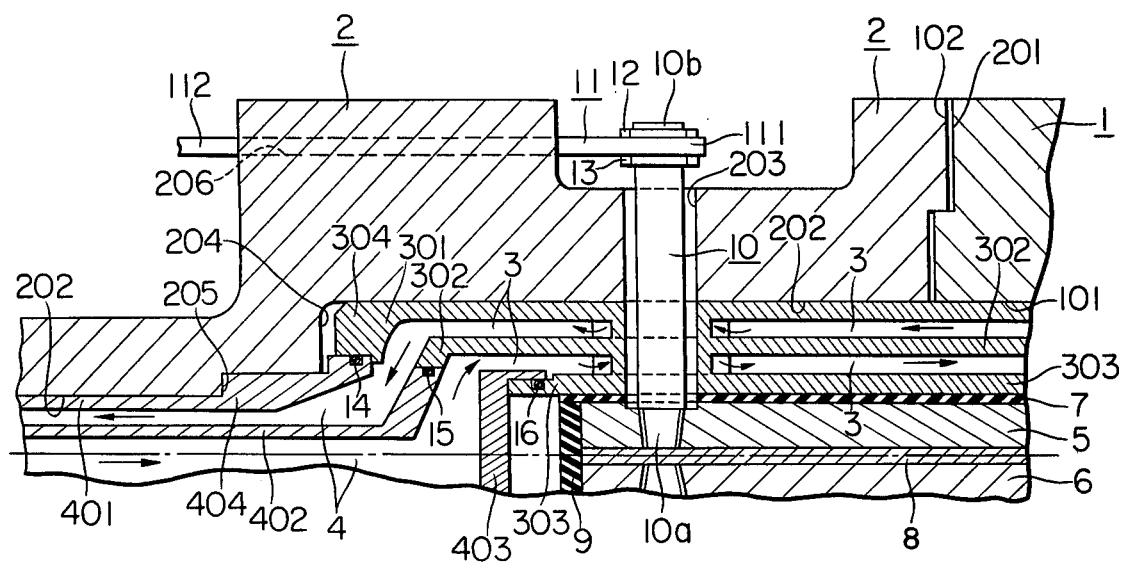
FIG. 2
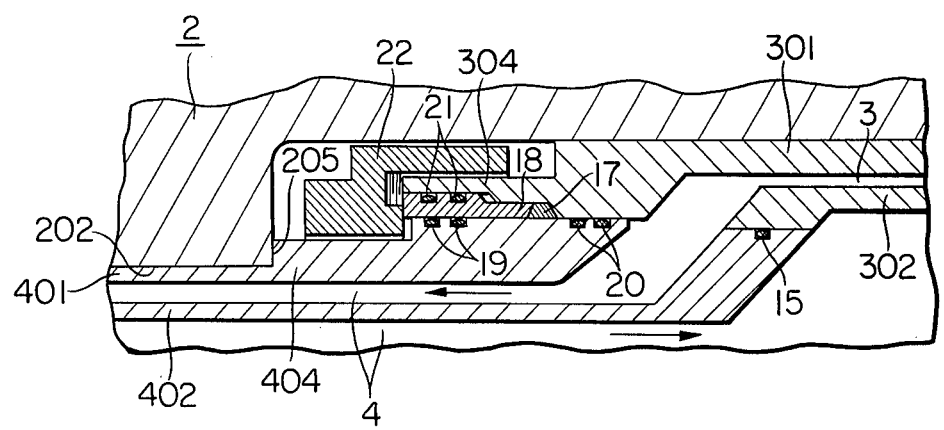

ary electric machine of the type having a liquid-cooled rotor, such as a turbine generator, and more specifically to a rotary electric machine of the type having a liquid-cooled rotor in which the construction of the connection between the generator shaft and the exciter shaft is improved.

2. Description of the Prior Art

In the rotary electric machines of the type, shafts rotatable around a common axis are used for both the exciter and the generator, and a rectified DC voltage from the exciter is applied to the field coil of the generator. For this purpose, therefore, a device is necessary to mechanically and electrically couple the exciter and the generator together.

The existing connection between the generator shaft and the exciter shaft in a rotary electric machine of the type having a liquid-cooled rotor, consists of; a junction portion between the generator shaft and the exciter shaft, a junction portion between a coolant path of the generator shaft and a coolant path of the exciter shaft, and a connection portion for electric circuits, wherein the junction portions and the connection portion are located in one place relative to the length direction of the common axis. Therefore, construction tends to become complicated, and the space for the junction portions and the connection is rather limited. Consequently, the cooling liquid often leaks, poor electrical connection creates increased contact resistance which gives rise to the development of heat which can destroy the machine, and subsequently, reliability is decreased.

SUMMARY OF THE INVENTION

The object of the present invention is to provide a rotary electric machine of the type having a liquid-cooled rotor and having increased reliability, in which; the junction portion between the generator shaft and the exciter shaft, the junction portion of the coolant path between the generator shaft and the exciter shaft, and the connection of the electric circuits therein, are located at different positions along the common axis, thereby increasing the available space for the junction portions and in the connection and reducing the leakage of cooling liquid, as well as increasing the reliability in the connection of the electric circuits.

Another object of the present invention is to provide a rotary electric machine of the type having a liquid-cooled rotor which completely prevents the leakage of cooling liquid, by providing a sealed device having a construction in which a trapezoidal rubber ring is compressed by a cap nut via a metal holder in the junction portion between the coolant path in the generator shaft and the coolant path in the exciter shaft.

BRIEF DESCRIPTION OF THE DRAWINGS

FIG. 1 is a section showing portions of a rotary electric machine of the type having a liquid-cooled rotor according to an embodiment of the present invention; and FIG. 2 is a section showing major portions of the rotary electric machine of the type having a liquid-cooled rotor according to another embodiment of the present invention.

In the drawings, the same portions are denoted by the same reference numerals.

DESCRIPTION OF THE PREFERRED EMBODIMENTS

FIG. 1 is a section showing portions of a rotary electric machine of the type having a liquid-cooled rotor according to the present invention. Referring to FIG. 1, a generator shaft 1 has a through axial hole 101 extending in the axial direction. An exciter shaft 2 has an end surface 102 that is contacted with an end surface 201 of the generator shaft 1, and has an axial first through hole 202 that is communicated with the through hole 101 and is the same diameter as hole 101, and a second through hole 203 extending in the radial direction which communicates with the first through hole 202. Stepped portions 204 and 205 are formed in the first through hole 202, the step portion 205 leading to a smaller diameter portion. A first coolant path 3 is made up of spaces defined by first to third cylindrical tubes 301 to 303 that are inserted in the through hole 101 and in part of the first through hole 202. The stepped end 304 of the first cylindrical tube 301 is in engagement with the end 404 of the cylindrical tube 401 The ends of tubes 301 and 302 are turned inwardly at an angle to the axis of the shafts. A second coolant path 4 is made up of spaces defined by first and second cylindrical tubes 401 and 402 that are inserted in the first through hole 202 and have the ends turned outwardly at an angle to the axis of the shafts to meet the ends of tubes 301 and 302, and have sealing surfaces in engagement with sealing surfaces on the ends of the tubes 301 and 302, and by a hollow portion of the second cylindrical tube 402 separated by a disc 403. The second coolant path 4 is communicated with the first coolant path 3 to allow flow of a cooling liquid in the direction of the indicating arrow. The end 404 of the first cylindrical tube 401 engages with the stepped portion 205. Axial conductors 5 and 6 are inserted in the third cylindrical tube 303, and are connected to the field winding (not shown) of the generator. An insulator 7 insulates the axial conductors 5 and 6 from the third cylindrical tube 303, an insulator 8 insulates the axial conductors 5, 6 from each other, and an insulator 9 insulates the end surfaces of the axial conductors 5 and 6. A radial conductor 10 extends in the radial direction and has the shape of a pole, and is inserted in the second through hole 203 of the exciter shaft 2. The inner end 10a of the conductor 10 is screwed into the axial conductor 5, and the outer periphery of the other end 10b is threaded. A connection conductor 11 is inserted in a groove 206 which is formed in the peripheral surface of the exciter shaft 2. The connection conductor 11 has one end 111 formed in the shape of a ring which is mounted around the other end 10b of the radial conductor 10, and is fastened by nuts 12 and 13. The other end 112 of the connection conductor 11 is connected to an external circuit via, for instance, a slip ring. An O-shaped ring 14 is fitted at the junction between the first cylindrical tube 301 and the first cylindrical tube 401, an O-shaped ring 15 is fitted at the junction between the second cylindrical tube 302 and the second cylindrical tube 402, and an O-shaped ring 16 is fitted at the junction between the third cylindrical tube 303 and the disc 403, in order to prevent the leakage of cooling liquid from the first and second coolant paths 3 and 4.

Below is a description of how to assemble the device. The first coolant path 3 is defined by the first to third cylindrical tubes 301 to 303, and the axial conductors 5 and 6 with insulators 7 to 9 are inserted in the hollow portion of the third cylindrical tube 303. Then, the structure defining the first coolant path 3 and the axial conductors 5 and 6, is inserted in the through hole 101 of the generator shaft 1 in such a manner that its left end protrudes beyond the generator shaft 1. Separately, a second coolant path 4 is defined by the first cylindrical tube 401, second cylindrical tube 402, and disc 403, and is inserted in the first through hole 202 of the exciter shaft 2 in such a manner that its right end protrudes beyond the exciter shaft 2. Then, tubes defining the first and second coolant paths 3 and 4 are joined together with O-shaped rings 14 to 16 being fitted to the junction portions, and the end surface 102 of the generator shaft 1 is brought into contact with the end surface 201 of the exciter shaft 2, to couple the generator shaft 1 and the exciter shaft 2 together. The means defining the first and second coolant paths 3 and 4 are thereby moved leftwards to bring the end portion 304 into engagement with the end portion 404, and the end portion 404 into engagement with the stepped portion 205. Finally, the radial conductor is screwed into the axial conductors 5 and 6, to complete the assembly. The junction between the one end surfaces of the generator shaft and the exciter shaft, the junctions between the ends of the tubes of the first and second coolant path defining means and the connection between the axial conductors and the radial conductors is located at different positions in the direction along the common axis The above-mentioned setup helps simplify the construction, eliminates the leakage of cooling liquid, and achieves good connection of electric circuits, thereby and enhancing the reliability of the machine.

FIG. 2 illustrates another embodiment of the present invention, in which the rotary electric machine of FIG. 1 is further improved for reducing the leakage of cooling liquid.

Generally, the means defining the first and second coolant paths 3 and 4 undergo thermal expansion and thermal contraction in the axial direction due to the change in temperature of the cooling liquid which flows therethrough. The amount of change is about several millimeters. The change is due to the varying temperature of the cooling liquid at the exhaust side as a result of changes in the load on the generator. The second coolant path 4 provided in the first through hole 202 of the exciter shaft 2 is pushed leftwards in FIG. 1 by the pressure of the cooling liquid, and the end portion 404 is engaged with the stepped portion 205. Therefore, movement of the first coolant path 3 in the axial direction due to thermal expansion and thermal contraction, appears at the sealing surfaces between the O-shaped rings 14 to 16 and the first to third cylindrical tubes 301 to 303. The pressure of the cooling liquid rises to about 10 to 20 kg/cm$^2$ due to the centrifugal force produced by the rotation of the generator shaft 1 and the exciter shaft 2. In the rotary electric machine of the type having a liquid-cooled rotor shown in FIG. 1, O-shaped rings 14 to 16, each constructed in one step, are provided on the sealing surfaces of the first to third cylindrical tubes 301 to 303. Therefore, movement also takes place in the axial direction on the sealing surfaces, which may cause cooling liquid to leak. If the cooling liquid leaks into the generator, the electric insulation of the generator deteriorates, and a serious accident may occur.

In the embodiment of FIG. 2, a trapezoidal rubber ring 17 made, for example, of a fluorine-containing rubber, is applied on the sealing seat in a space defined between the first cylindrical tube 301 and the first cylindrical tube 401. A ring member 18 compresses the trapezoidal rubber ring 17. O-shaped rings 19, 20, 21 are fitted into the sealing surfaces on the right and left sides of the trapezoidal rubber ring 17. A cap nut 22 engages with a screw thread (not shown) formed on the outer periphery of the end 304 of the first cylindrical tube 301, and pushes the ring member 18 to compress the trapezoidal rubber ring 17.

According to the present invention constructed as described above, the junction position between the end surface 102 of the generator shaft 1 and the end surface 201 of the exciter shaft 2, the junction position between the first coolant path 3 and the second coolant path 4, and the connection position between the radial conductor 10 and the axial conductors 5, 6, are offset from each other, and are in the order of the junction position between the end surface 102 of the generator shaft 1 and the end surface 201 of the exciter shaft 2, the connection position between the radial conductor 10 and the axial conductors 5 and 6, and the junction position between the first coolant path 3 and the second coolant path 4, as viewed from the position of the generator (not shown). Therefore, increased space can be provided for the junction portions and for the connection position, the structure can be simplified, the cooling liquid is prevented from leaking, the electric circuits can be desirably connected, and the reliability can be enhanced. Further, since the trapezoidal rubber ring 17 is compressed by the cap nut 22 via holder metal 18, leakage of the cooling liquid can be completely prevented.

The above-described embodiments relate to the case when the axial conductors 5 and 6 are incorporated inside the coolant path 3. The axial conductors 5 and 6, however, may be incorporated in the first coolant path 3, the through hole 101, or the first through hole 202. It is also possible to use gaskets, V-shaped rings, trapezoidal rings and metal packings, instead of the O-shaped rings 14 to 16.

What is claimed is:

1. A rotary electric machine of the type having a liquid-cooled rotor, comprising:

a generator shaft having an axial hole therethrough;

an exciter shaft on a common axis with said generator shaft, one end surface of which exciter shaft is in contact with one end surface of said generator shaft, and which exciter shaft has a first axial hole with an end surface portion having substantially the same diameter as said generator shaft hole and communicating with said generator shaft hole and a smaller diameter portion extending in a direction away from said one end surface and communicating with said end surface portion, and a second hole extending in the radial direction from said end surface portion of said first axial hole;

a first coolant path defining means constituted by a plurality of concentric tubes defining coolant paths therebetween and positioned in the axial hole in said generator shaft and extending into the end surface portion of the first axial hole in said exciter shaft and the ends of the tubes within said end surface portion turned inwardly at an angle to the axis of the shafts and having sealing surfaces on the inwardly facing ends of the inwardly turned portions;

a second coolant path defining means constituted by a plurality of concentric tubes defining coolant paths therebetween and positioned in the smaller diameter portion of the axial hole in said exciter shaft and having the ends of the tubes within the end surface portion turned outwardly at an angle to the axis of the shafts and having sealing surfaces on the outwardly facing ends of the outwardly turned portions abutting the inwardly facing ends of the inwardly turned portions in sealing relationship for communicating the coolant paths of the second coolant path defining means with the respective coolant paths of the first coolant path defining means;

axial conductors within the innermost tube of the first coolant path defining means in said generator shaft and extending into part of said end surface portion of the first axial hole in said exciter shaft;

radial conductors in the second hole of the exciter shaft and extending through said first coolant path defining means and being connected to said axial conductors; and the junction between the one end surfaces of said generator shaft and said exciter shaft, the junctions between the ends of the tubes of the first and second coolant path defining means and the connection between the axial conductors and the radial conductors being located at different positions in the direction along said common axis.

2. A rotary electric machine as claimed in claim 1 wherein the junction between the end surfaces of said shafts, the junctions between the ends of the tubes of the first and second coolant path defining means and the connection between the axial conductors and the radial conductors are positioned along the said common axis in the order of the junction between the end surfaces of the shafts, the connection between the axial conductors and the radial conductors, and the junction between the ends of the tubes of the first and second coolant path defining means.

3. A rotary electric machine as claimed in claim 1 in which said axial hole in said exciter shaft has a stepped portion and the end of at least one tube of said second coolant path defining means has a corresponding stepped portion engaged with said first-mentioned step portion.

4. A rotary electric machine as claimed in claim 1 wherein the outermost tubes of said coolant path defining means have a space defined between them where they are in abutting relationship with a seat on one of said tubes facing in the direction along the shafts, a resilient ring around the inner abutting surface in abutment with said seat, a ring member in said space engaging said ring, and a cap nut threaded onto the outer periphery of the outermost tube of the first coolant path defining means engaging said ring member for, when the cap nut is threaded onto the tube, urging the ring member against said resilient ring to sealingly engage said ring with said seat and the opposed faces of said tubes for sealing the joint between said tubes.

5. A rotary electric machine as claimed in claim 4 further comprising O-rings in one of said tubes abutting the other on one side of said resilient ring, and further O-rings between the surfaces of the tubes defining said space and the surfaces of said ring member on the other side of said resilient ring.

* * * * *